US012566141B2

(12) United States Patent
Suzuki

(10) Patent No.: US 12,566,141 B2
(45) Date of Patent: Mar. 3, 2026

(54) PERACETIC ACID FORMULATION CONCENTRATION DETERMINATION METHOD

(71) Applicant: SUZUKEN KABUSHIKI KAISHA, Tokyo (JP)

(72) Inventor: Hiroyuki Suzuki, Tokyo (JP)

(73) Assignee: SUZUKEN KABUSHIKI KAISHA, Tokyo (JP)

( * ) Notice: Subject to any disclaimer, the term of this patent is extended or adjusted under 35 U.S.C. 154(b) by 710 days.

(21) Appl. No.: 17/633,438

(22) PCT Filed: Jul. 27, 2020

(86) PCT No.: PCT/JP2020/028633
§ 371 (c)(1),
(2) Date: Feb. 7, 2022

(87) PCT Pub. No.: WO2021/039228
PCT Pub. Date: Mar. 4, 2021

(65) Prior Publication Data
US 2022/0283095 A1 Sep. 8, 2022

(30) Foreign Application Priority Data
Aug. 23, 2019 (JP) ................................. 2019-152431

(51) Int. Cl.
*G01N 21/78* (2006.01)
*G01N 31/00* (2006.01)
(52) U.S. Cl.
CPC ............. *G01N 21/78* (2013.01); *G01N 31/00* (2013.01)
(58) Field of Classification Search
CPC ........ G01N 21/78; G01N 31/00; G01N 31/22; G01N 21/293
See application file for complete search history.

(56) References Cited

U.S. PATENT DOCUMENTS

| | | | |
|---|---|---|---|
| 4,900,682 A | 2/1990 | Fischer et al. | |
| 2010/0183480 A1 | 7/2010 | Maruo et al. | |

(Continued)

FOREIGN PATENT DOCUMENTS

| | | | |
|---|---|---|---|
| CN | 108107039 A | 6/2018 | |
| CN | 108827955 A | 11/2018 | |

(Continued)

OTHER PUBLICATIONS

Extended (Supplementary) European Search Report dated, Jan. 9, 2023, issued in counterpart EP Application No. 20859226.1. (7 Pages).

(Continued)

*Primary Examiner* — Lyle Alexander
*Assistant Examiner* — Dwan A Gerido
(74) *Attorney, Agent, or Firm* — WHDA, LLP

(57) ABSTRACT

A method includes: disposing a light-transmissive container containing a target solution in which a reagent is added to a solution of a peracetic acid formulation side by side with a plurality of color samples, wherein the peracetic acid formulation being for food use, and the concentration of the peracetic acid formulation being 50 mg/L to 500 mg/L, and visually identifying transmitted light transmitted through the container and any one of the plurality of color samples so that the concentration of the peracetic acid formulation contained in the target solution is determined, wherein each of the plurality of color samples exhibits a color corresponding to each of a plurality of the target solutions containing solutions of the peracetic acid formulation of mutually different concentrations, and the plurality of target solutions corresponding to the color samples exhibit an absorbance of 1.5 to light in wavelength ranges different from each other.

8 Claims, 9 Drawing Sheets

(56) References Cited

U.S. PATENT DOCUMENTS

| | | | | |
|---|---|---|---|---|
| 2019/0302071 A1* | 10/2019 | Jang | ..................... | G01N 31/22 |
| 2021/0208119 A1* | 7/2021 | Greenawalt | ........... | A01N 37/16 |

FOREIGN PATENT DOCUMENTS

| | | |
|---|---|---|
| JP | 2640847 B2 | 8/1997 |
| JP | 3170526 B2 | 5/2001 |
| JP | 2006-242629 A | 9/2006 |
| JP | 2008-89405 A | 4/2008 |
| JP | 2010-60437 A | 3/2010 |
| JP | 2014-44049 A | 3/2014 |

OTHER PUBLICATIONS

International Search Report dated Aug. 25, 2020, issued in counterpart International Application No. PCT/JP2020/028633, with English Translation. (4 pages).

Notification Concerning Transmittal of Copy of International Preliminary Report on Patentability (Form PCT/IB/326) Issued in counterpart International Application No. PCT/JP2020/028633 mailed Mar. 3, 2022, with Forms PCT/ B/373, PCT/IB/338 and PCT/ISA/237. (6 pages).

* cited by examiner 680 nm 730 nm

[Fig.6]
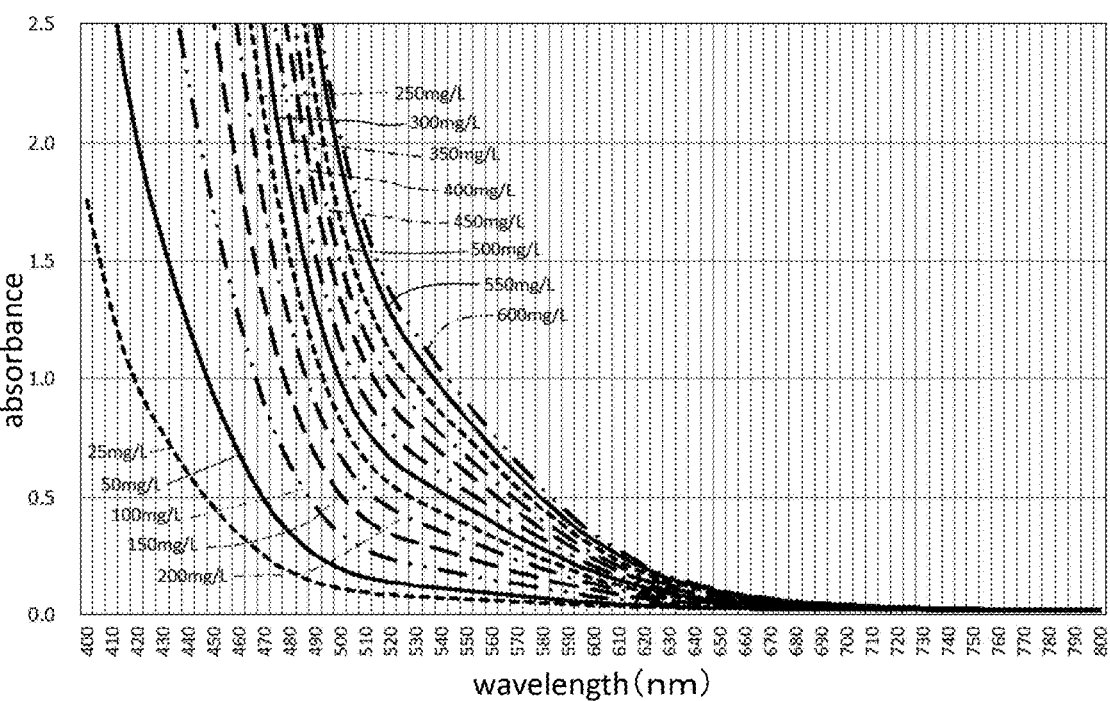

[Fig.7]
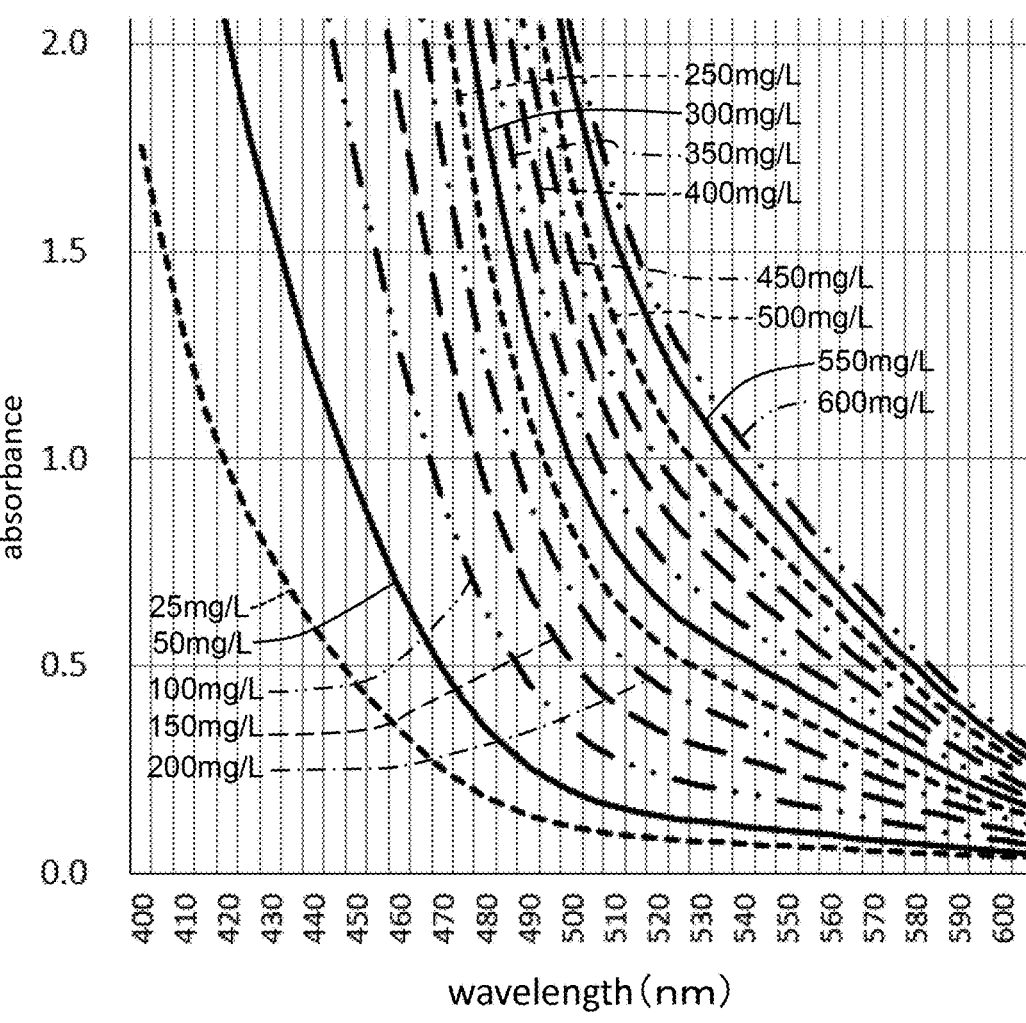

[Fig.8]

| concentration of peracetic acid formulation solution (mg/L) | wavelength (nm) | absorbance | | | coloration of target solution |
|---|---|---|---|---|---|
| | | 0.5 | 1.0 | 1.5 | |
| 25 | minimum wavelength | — | — | — | |
| | center wavelength | 445 | 420 | 405 | |
| | maximum wavelength | 465 | 444 | 429 | |
| 50 | minimum wavelength | 450 | 421 | 410 | |
| | center wavelength | 470 | 445 | 430 | |
| | maximum wavelength | 485 | 464 | 450 | |
| 100 | minimum wavelength | 471 | 450 | 435 | |
| | center wavelength | 487 | 465 | 455 | |
| | maximum wavelength | 499 | 475 | 464 | |
| 150 | minimum wavelength | 490 | 470 | 456 | |
| | center wavelength | 500 | 479 | 465 | |
| | maximum wavelength | 510 | 484 | 473 | |
| 200 | minimum wavelength | 505 | 480 | 468 | |
| | center wavelength | 515 | 485 | 475 | |
| | maximum wavelength | 525 | 490 | 479 | |
| 250 | minimum wavelength | 516 | 487 | 476 | |
| | center wavelength | 530 | 495 | 480 | |
| | maximum wavelength | 540 | 498 | 484 | |
| 300 | minimum wavelength | 531 | 496 | 482 | |
| | center wavelength | 545 | 500 | 485 | |
| | maximum wavelength | 550 | 504 | 489 | |

[Fig.9]

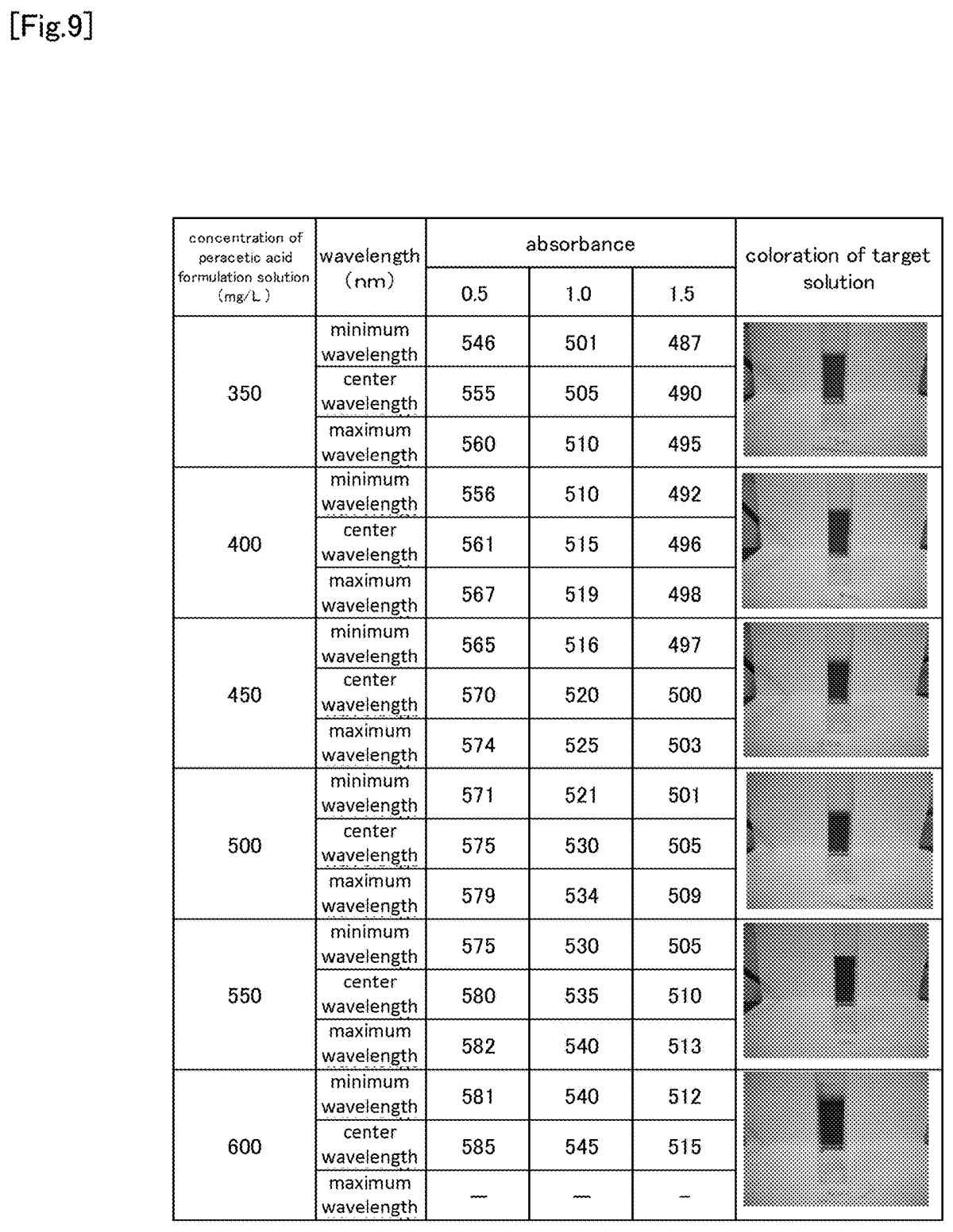

| concentration of peracetic acid formulation solution (mg/L) | wavelength (nm) | absorbance | | | coloration of target solution |
|---|---|---|---|---|---|
| | | 0.5 | 1.0 | 1.5 | |
| 350 | minimum wavelength | 546 | 501 | 487 | |
| | center wavelength | 555 | 505 | 490 | |
| | maximum wavelength | 560 | 510 | 495 | |
| 400 | minimum wavelength | 556 | 510 | 492 | |
| | center wavelength | 561 | 515 | 496 | |
| | maximum wavelength | 567 | 519 | 498 | |
| 450 | minimum wavelength | 565 | 516 | 497 | |
| | center wavelength | 570 | 520 | 500 | |
| | maximum wavelength | 574 | 525 | 503 | |
| 500 | minimum wavelength | 571 | 521 | 501 | |
| | center wavelength | 575 | 530 | 505 | |
| | maximum wavelength | 579 | 534 | 509 | |
| 550 | minimum wavelength | 575 | 530 | 505 | |
| | center wavelength | 580 | 535 | 510 | |
| | maximum wavelength | 582 | 540 | 513 | |
| 600 | minimum wavelength | 581 | 540 | 512 | |
| | center wavelength | 585 | 545 | 515 | |
| | maximum wavelength | — | — | — | |

PERACETIC ACID FORMULATION CONCENTRATION DETERMINATION METHOD

TECHNICAL FIELD

The present invention relates to a method for determining concentration of a peracetic acid formulation, and more particularly to a method for determining concentration of a peracetic acid formulation for food use.

BACKGROUND ART

Disinfectants for food are deemed to be important in order to prevent food poisoning. However, there are some concerns about chlorine-based disinfectants that have been used for a long time, such as strong odor, low stability, and persistence; peracetic acid formulations, therefore, are attracting attention as a disinfectant that can address these concerns. Peracetic acid formulations, having almost no odor, being highly stable after dilution to a concentration suitable for use in food, and having very low persistence in food, are expected to replace chlorine-based disinfectants. Such peracetic acid formulations have been widely used for sterilization of a wide range of foods such as vegetables, fruits, and meat in many countries. In Japan, peracetic acid formulations have been designated as an allowable food additive in recent years, and its production/use standards and ingredient standards have just been announced.

CITATION LIST

Patent Literature

Patent Document 1: Japanese Patent No. 3170526
Patent Document 2: Japanese Unexamined Patent Publication No. 2006-242629

SUMMARY OF INVENTION

Technical Problem

However, in the past, although there was an official method for confirming the ingredient specifications of undiluted peracetic acid formulations, there was no official method for confirming the practical concentration in the diluted state for use in food. As practical concentration measurement methods, there have been known a method using test paper and a method using an apparatus having a complicated configuration for iodometric titration method; however, the method using test paper is, although convenient for measurement, inaccurate and unreliable especially at low concentration (see, for example, Patent Documents 1 and 2). Further, apparatus for the iodometric titration method, which is large and heavy, is not suitable for convenient and quick measurement.

It is therefore an object of the present invention to provide a method for determining concentration of a peracetic acid formulation, which can determine the concentration of the peracetic acid formulation easily and quickly with high accuracy.

Solution to Problem

In order to solve the above problems, a method for determining concentration of a peracetic acid formulation according to the present invention includes a step of disposing a light-transmissive container containing a target solution (a solution of interest) in which a reagent of a predetermined concentration is added to a solution of a peracetic acid formulation side by side with a plurality of color samples each having a color corresponding to respective concentrations of a plurality of stages, the peracetic acid formulation being for food use, and the concentration of the peracetic acid formulation being in the range of 50 mg/L to 500 mg/L, the method further includes a step of visually identifying transmitted light transmitted through the container and any one of the plurality of color samples so that the concentration of the peracetic acid formulation contained in the target solution is able to be determined, wherein each of the plurality of color samples exhibits a color corresponding to each of a plurality of the target solutions containing solutions of the peracetic acid formulation of mutually different concentrations, and the plurality of target solutions corresponding to the color samples exhibit an absorbance of 1.5 to light in wavelength ranges different from each other.

Absorbance can be set to less than 1.5 depending on the type of target food and peracetic acid formulation. For example, a color sample having a color corresponding to a solution exhibiting an absorbance of 1.0 or 0.5 may be used.

In the method for determining concentration of a peracetic acid formulation of the present invention, it is preferable that the plurality of color samples include at least one of a color sample exhibiting a color corresponding to the target solution containing a solution of the peracetic acid formulation at a concentration of 50 mg/L and a color sample exhibiting a color corresponding to the target solution containing a solution of the peracetic acid formulation at a concentration of 500 mg/L, wherein the reagent is potassium iodide and when the predetermined concentration is 10%, the target solution containing a solution of the peracetic acid formulation at a concentration of 50 mg/L exhibits an absorbance of 1.5 with respect to light in a wavelength range including 430 nm, and the target solution containing a solution of the peracetic acid formulation at a concentration of 500 mg/L exhibits an absorbance of 1.5 with respect to light in a wavelength range including 505 nm.

Here, it is possible to use a color sample having a color corresponding to a target solution exhibiting a value less than 1.5, e.g., an absorbance of 1.0 or 0.5 instead of the absorbance of 1.5.

In the case of employing the absorbance of 1.0, it is preferable that the target solution containing a solution of the peracetic acid formulation at a concentration of 50 mg/L exhibits an absorbance of 1.0 with respect to light in a wavelength range including 445 nm, and the target solution containing a solution of the peracetic acid formulation at a concentration of 500 mg/L exhibits an absorbance of 1.0 with respect to light in a wavelength range including 530 nm.

In the case of employing the absorbance of 0.5, it is preferable that the target solution containing a solution of the peracetic acid formulation at a concentration of 50 mg/L exhibits an absorbance of 0.5 with respect to light in a wavelength range including 470 nm, and the target solution containing a solution of the peracetic acid formulation at a concentration of 500 mg/L exhibits an absorbance of 0.5 with respect to light in a wavelength range including 575 nm.

In the method for determining concentration of a peracetic acid formulation of the present invention, it is preferable that the target solution containing a solution of the peracetic acid formulation at a concentration of 50 mg/L exhibits an absorbance of 1.5 with respect to light in a wavelength range from 410 nm to 450 nm.

In the case of employing the absorbance of 1.0 instead of the absorbance 1.5, it is preferable that the target solution preferably exhibits an absorbance of 1.0 with respect to light in a wavelength range from 421 nm to 464 nm. In the case of employing the absorbance of 0.5, the target solution preferably exhibits an absorbance of 0.5 with respect to light in a wavelength range from 450 nm to 485 nm.

In the method for determining concentration of a peracetic acid formulation of the present invention, it is preferable that the target solution containing a solution of the peracetic acid formulation at a concentration of 500 mg/L exhibits an absorbance of 1.5 with respect to light in a wavelength range from 501 nm to 509 nm.

Here, in the case of employing the absorbance of 1.0 instead of the absorbance of 1.5, it is preferable that the target solution preferably exhibits an absorbance of 1.0 with respect to light in a wavelength range from 521 nm to 534 nm. In the case of employing the absorbance of 0.5, it is preferable that the target solution preferably exhibits an absorbance of 0.5 with respect to light in a wavelength range from 571 nm to 579 nm.

In the method for determining concentration of a peracetic acid formulation of the present invention, it is preferable that the plurality of color samples include a color sample corresponding to at least one of the target solutions containing a solution of the peracetic acid formulation at a concentration of 100 mg/L, 150 mg/L, 200 mg/L, 250 mg/L, 300 mg/L, 350 mg/L, 400 mg/L, and 450 mg/L, the target solution containing a solution of the peracetic acid formulation at a concentration of 100 mg/L exhibits an absorbance of 1.5 with respect to light in a wavelength range including 455 nm, the target solution containing a solution of the peracetic acid formulation at a concentration of 150 mg/L exhibits an absorbance of 1.5 with respect to light in a wavelength range including 465 nm, the target solution containing a solution of the peracetic acid formulation at a concentration of 200 mg/L exhibits an absorbance of 1.5 with respect to light in a wavelength range including 475 nm, the target solution containing a solution of the peracetic acid formulation at a concentration of 250 mg/L exhibits an absorbance of 1.5 with respect to light in a wavelength range including 480 nm, the target solution containing a solution of the peracetic acid formulation at a concentration of 300 mg/L exhibits an absorbance of 1.5 with respect to light in a wavelength range including 485 nm, the target solution containing a solution of the peracetic acid formulation at a concentration of 350 mg/L exhibits an absorbance of 1.5 with respect to light in a wavelength range including 490 nm, the target solution containing a solution of the peracetic acid formulation at a concentration of 400 mg/L exhibits an absorbance of 1.5 with respect to light in a wavelength range including 496 nm, and the target solution containing a solution of the peracetic acid formulation at a concentration of 450 mg/L exhibits an absorbance of 1.5 with respect to light in a wavelength range including 500 nm.

In the case of employing the absorbance of 1.0 instead of the absorbance of 1.5, the target solution preferably exhibits the absorbance of 1.0 with respect to light in a wavelength range including the following wavelengths.

| PERACETIC ACID FORMULATION CONCENTRATION | WAVELENGTHS INCLUDED IN RANGE |
| --- | --- |
| 100 mg/L | 465 nm |
| 150 mg/L | 479 nm |
| 200 mg/L | 485 nm |
| 250 mg/L | 495 nm |
| 300 mg/L | 500 nm |
| 350 mg/L | 505 nm |
| 400 mg/L | 515 nm |
| 450 mg/L | 520 nm |

In the case of employing the absorbance of 0.5, the target solution preferably exhibits the absorbance of 0.5 with respect to light in a wavelength range including the following wavelengths.

| PERACETIC ACID FORMULATION CONCENTRATION | WAVELENGTHS INCLUDED IN RANGE |
| --- | --- |
| 100 mg/L | 487 nm |
| 150 mg/L | 500 nm |
| 200 mg/L | 515 nm |
| 250 mg/L | 530 nm |
| 300 mg/L | 545 nm |
| 350 mg/L | 555 nm |
| 400 mg/L | 561 nm |
| 450 mg/L | 570 nm |

Advantageous Effects of Invention

The method for determining concentration of a peracetic acid formulation according to the present invention can simply and quickly determine concentration of a peracetic acid formulation with high accuracy.

BRIEF DESCRIPTION OF DRAWINGS

FIG. 6 is a spectral diagram illustrating the change in absorbance with respect to the wavelength of incident light when the concentration of the peracetic acid formulation is changed when the concentration of the potassium iodide is 10%.

FIG. 7 is an enlarged view of a part of FIG. 6.

FIG. 8 is a diagram showing the wavelengths exhibiting the absorbances of 0.5, 1.0, and 1.5 as well as the colorations of the target solution when the concentration of the peracetic acid formulation solution in the target solution is 25 to 300 mg/L.

FIG. 9 is a diagram showing the wavelengths exhibiting absorbances of 0.5, 1.0, and 1.5, as well as the colors of the solution when the concentration of the peracetic acid formulation solution in the target solution is 350 to 600 mg/L.

MODE FOR CARRYING OUT THE INVENTION

Hereinafter, a peracetic acid formulation concentration determination apparatus and a reagent used in the peracetic acid formulation concentration determination method according to an embodiment of the present invention will be described in detail with reference to the drawings.

Figures 1A, 1B:
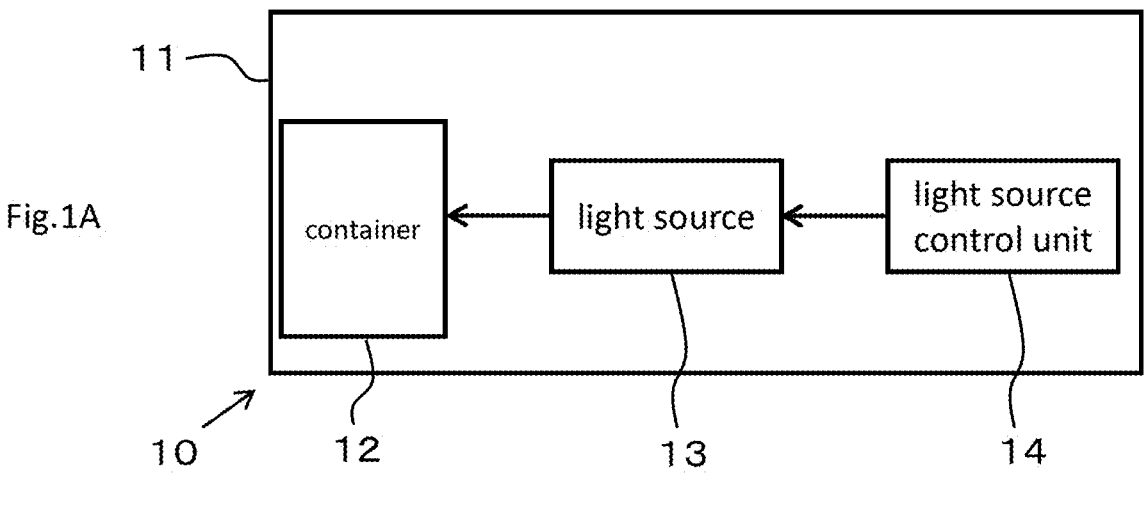
FIG. 1A is a diagram conceptually illustrating the configuration of a peracetic acid formulation concentration determination apparatus according to an embodiment of the present invention.
FIG. 1B is a diagram conceptually showing the configuration of the peracetic acid formulation concentration determination apparatus of FIG. 1A in which a container and a color sample display part are disposed side by side.

The structure of the peracetic acid formulation concentration determination apparatus will be described with reference to FIGS. 1A and 1B. FIG. 1A is a diagram conceptually showing the configuration of a peracetic acid formulation concentration determination apparatus 10 according to the present embodiment, and FIG. 1B is a diagram conceptually showing the configuration in which a container 12 and a color sample display part 15 are disposed side by side in the peracetic acid formulation concentration determination apparatus 10 of FIG. 1A.

Although the following description explains a method for determining concentration of a peracetic acid formulation by using the peracetic acid formulation concentration determination apparatus, it is possible to determine concentration of the peracetic acid formulation contained in the target solution in the container 12 by disposing a plurality of color samples similar to the color sample display part 15 and the container 12 side by side, and visually identifying the transmitted light transmitted through the container 12 and any one of the plurality of color samples under a similar environment without using the peracetic acid formulation concentration determination apparatus. In this case, a light source for irradiating the container 12 with the measurement light and a control unit for controlling the light source are not provided, and the concentration of the peracetic acid formulation can be determined based on the transmitted light transmitted through the container 12 when visible light enters the container 12. Examples of the visible light include illumination light in a room where the container 12 is disposed and external light in an outdoor space.

As shown in FIG. 1A, the peracetic acid formulation concentration determination apparatus 10 accommodates the container 12 in its housing 11, and further provided with a light source 13 and a light source control unit 14. The container 12 is accommodated in a predetermined space provided in the housing 11. As shown in FIG. 1B, the color sample display part 15 is provided on the front surface of the housing 11 so as to be aligned with the container 12.

The housing 11 has predetermined water resistance and durability, and is made of a material that can be made of a portable weight, e.g., a resin material. Thus, it is possible to prevent malfunction from occurring even if water adheres to the container 12 when touched with, e.g., wet hands in the handling of the container, and it is also possible to prevent the container from becoming inoperable because the container is hardly damaged even when an impact is applied during transportation or handling.

The container 12 is made of a colorless and transparent material having light transmitting property such as a resin material or glass. The container 12 is provided with an incident surface and an emission surface that are opposite to each other, wherein the measurement light from the light source 13 is incident on the incident surface, passes through the target solution in the container, and is emitted to the outside from the emission surface located in front of the housing 11.

The container 12 can be configured as follows, for example.

Material: Borosilicate Glass
Size (mm): 12.5×12.5×45
Optical path length×optical path width (mm): 10×10
Volume (mL): 3.5
Double-side transparent An example of such a container is a glass cell (model number G-104) available from AS ONE CORPORATION.

Here, forming at least a portion in the housing 11 accommodating the container 12 with a material not transmitting light allows the transmitted light of the target solution to be emitted from the emission surface without waste, whereby it is possible to stabilize the measurement accuracy.

The container 12 contains a target solution in which a reagent of a predetermined concentration is added to a solution of a peracetic acid formulation.

This peracetic acid formulation is a formulation for food, more specifically, a formulation used for surface sterilization of meats such as beef, chicken, and pork, as well as vegetables. In accordance with the standards of the Ministry of Health, Labour and Welfare in Japan, peracetic acid formulations are made from peracetic acid or acetic acid, hydrogen peroxide, and 1-hydroxyethylidene-1,1-diphosphonic acid or octanoic acid, and are prepared by mixing peracetic acid or acetic acid and hydrogen peroxide with 1-hydroxyethylidene-1,1-diphosphonic acid or with octanoic acid.

The reagent is potassium iodide and its concentration (mass concentration) is preferably 5% or more. For example, when 5 g of potassium iodide is added to 100 mL of a solution of a peracetic acid formulation, the concentration of potassium iodide of is 5% ("L" stands for Litter). By setting the concentration of potassium iodide to 5% or more, it is possible to clarify the color difference of the transmitted light transmitted through the target solution in accordance with the concentration difference of the peracetic acid formulation in the target solution, so that the concentration determination of the peracetic acid formulation can be performed with high accuracy. On the contrary, when the concentration of potassium iodide is less than 5%, it is difficult to judge the concentration of the peracetic acid formulation by visual observation because the color of the transmitted light fluctuates and is unstable, making it difficult to compare and identify the color with the color sample display part 15.

The concentration of potassium iodide is preferably more than 5% from the viewpoint of color stability. Further, the concentration of 10% or more is more preferable in order to further improve the stability of coloring.

Moreover, it is preferable to add a small amount of a buffering agent composed of sodium dithionite as an auxiliary agent for stabilizing the coloring, and citric acid and disodium hydrogenphosphate for adjusting the pH. In order to enhance the preservability of the solution, ethylenediaminetetraacetic acid is preferably blended in a range of 0.01% or less.

The light source 13 irradiates the container 12 with measurement light of a predetermined range of wavelengths. The type of the light source is not limited as long as the wavelength range of the measurement light is controllable, and a light emitting diode (LED) can be used for example. A light source having a wide emission wavelength may be used with a filter which can limit the wavelength. The filter may be provided on or near the incident surface of the container 12, or the incident surface of the container 12 may have a predetermined color to provide the filter function. The wavelength range of the measurement light is controlled by the light source control unit 14. In addition to the wavelength, the light source control unit 14 also controls the operation of the light source 13, e.g., ON/OFF states and emission intensity.

The wavelength of the measurement light to be irradiated to the target solution using potassium iodide as a reagent is preferably in the range of 480 nm to 680 nm. This range will make the change in the absorbance calculated based on the measurement light irradiated on the target solution and the transmitted light transmitted through the target solution to be approximately proportional to the change in the concentration of the peracetic acid formulation. Therefore, it is possible to accurately determine the concentration of the peracetic acid formulation by the absorbance or color of the transmitted light. On the contrary, in wavelength ranges out of this range, i.e., when the measurement light wavelength is less than 480 nm or more than 680 nm, the change in the absorbance with respect to the change in the concentration of the peracetic acid formulation is not proportional so that it is difficult to determine the concentration of the peracetic acid formulation from the absorbance and color of the transmitted light.

Further, the wavelength of the measurement light of 530 nm or more and 680 nm or less will enhance the linearity of the change in the absorbance with respect to the change in the concentration of the peracetic acid formulation, thereby improving the accuracy of the determination of the concentration of the peracetic acid formulation. The wavelength of the measurement light of 530 nm or more and 630 nm or less can maintain the intensity of the transmitted light to a certain level or more, so that the concentration of the peracetic acid formulation can be easily and accurately determined.

The color sample display part 15 shows a plurality of color samples corresponding to respective concentrations of a plurality of stages of a solution of a peracetic acid formulation. The container 12 and the color sample display part 15 are disposed side by side, so that the plurality of color samples and the container 12 are disposed side by side. In the example shown in FIG. 1B, six color samples 15a, 15b, 15c, 15d, 15e, and 15f are disposed side by side with the container 12. The color samples 15a to 15f have colors that are visually distinguishable from each other. Therefore, it is possible to visually identify the transmitted light transmitted through the container 12 and any one of the plurality of color samples, thereby enabling the determination of the concentration of the peracetic acid formulation contained in the target solution, so that the concentration determination can be easily and accurately performed. The color samples 15a to 15f are formed so as to exhibit a reflective color by, e.g., printing on a plate material made of a white resin material that does not transmit light. The colors of the color samples 15a to 15f can be set so as to be distinguishable by the operator by, e.g., defining the colors by using the visible absorption spectrum of the reflected light.

The color sample display part 15 may be made of a light-transmissive material, and the color samples 15a to 15f may be made of, e.g., a light-transmissive film so as to exhibit a transmitted color. In this case, light emitted from the light source 13 may be irradiated from the inside of the housing 11 to the color sample display part 15.

Here, the plurality of color samples may include both those in which the color corresponding to the concentration of the solution of the peracetic acid formulation is produced by additive mixing and those in which the color corresponding to the concentration of the solution of the peracetic acid formulation is produced by subtractive mixing. The color samples produced by additive mixing are colored such that the color of transmitted light corresponds to the color of transmitted light of the solution of the peracetic acid formulation, e.g., in the spectrum of absorbance. The color samples produced by subtractive mixing are colored so that the color of the reflected light corresponds to the color of the transmitted light of the solution of the peracetic acid formulation, e.g., the absorbance spectrum of the solution and the reflection spectrum of the color sample correspond to each other. In addition, the color samples can be made of e.g., a film or paper having transparency or reflectivity, and also include those displayed on a display of for a personal computer, a screen of a smartphone, a cellular phone, or other portable information terminal.

With the configuration of the color sample display part 15 described above, the color of the transmitted light from the container 12 can be easily compared with the colors of the color samples 15a to 15f of the color sample display part 15, and any color of the color samples 15a to 15f of the color sample display part 15 can be easily and visually identified with the color of the transmitted light of the container 12. Each color of the color samples 15a to 15f is set to a color corresponding to each color when each of the target solutions exhibits a common specific absorbance in a spectrum diagram (for example, FIG. 6) measured for the target solutions having mutually different concentrations. The specific absorbance is preferably 1.5 or less, for example, 1.5, 1.0, or 0.5. Each concentration of the target solution exhibits a common absorbance, for example, absorbance of 1.5, at mutually different incident light wavelengths.

Further, in preparing the spectral diagram and the color sample, it is preferable to provide a constant density difference in the target solution in order to ensure that the target solution of each density can be identified. The concentration difference is preferably 50 mg/L.

The number and form of the color samples in the color sample display part 15 are not limited to the number and form illustrated in FIG. 1B. For example, the number may be less than six or more than six. In addition, instead of the configuration fixed to the housing 11 as shown in FIG. 1B, the plurality of color samples may be disposed on a rotatable substrate. In this case, it is possible to facilitate comparison between the color samples and the transmitted light from the container 12 by, e.g., sequentially placing the plurality of color samples along the outer periphery on the surface of a disk and rotating the disk about the center of the plane to dispose the color samples in order side by side with the container 12.

Further, by making color samples of the color sample display part 15 to be replaceable in accordance with the usage and type of the peracetic acid formulation, the color samples in the assumed range can be compared with the transmitted light, so that the concentration can be determined efficiently with high accuracy.

Next, examples will be described.

FIGS. 2A to 5B are graphs illustrating changes in absorbance (vertical axis) with respect to the concentration (PAA concentration) (mg/L) (horizontal axis) of the peracetic acid formulation in the target solution. FIGS. 2A to 3B illustrate cases where the concentration of potassium iodide is 2 to 5%, and FIGS. 4A to 5B illustrate cases where the concentration of potassium iodide is 5 to 50%. FIGS. 2A to 3B respectively show potassium iodide concentrations of 2.0%, 3.0%, 4.0%, and 5.0%. FIGS. 4A to 5B respectively show potassium iodide concentrations of 5%, 10%, 20%, and 50%.

PERSAN MP2-J (trade name) available from Enviro Tech Japan Co., Ltd. was used as the peracetic acid formulation in the target solution. The peracetic acid formulation is composed of 15% of peracetic acid, 40% of acetic acid, 5.5% of hydrogen peroxide, and less than 1% of stabilizer (mass concentration).

In each of FIGS. 2A to 5B, the wavelengths of the measurement light irradiated to the container 12 are as follows.

Figure 2A:
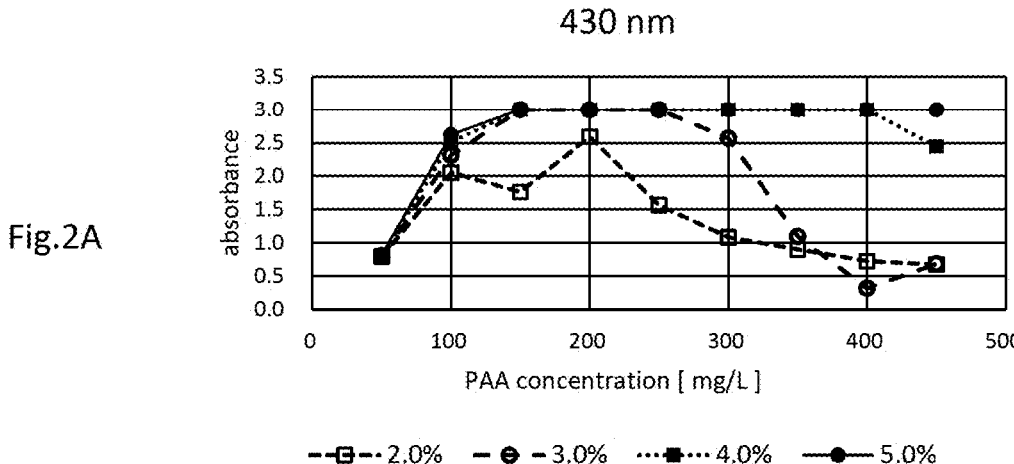
FIGS. 2A to 2C are graphs illustrating the change in absorbance with respect to the concentration of the peracetic acid formulation in a target solution when the concentration of potassium iodide is 2 to 5%.
Figure 2B:
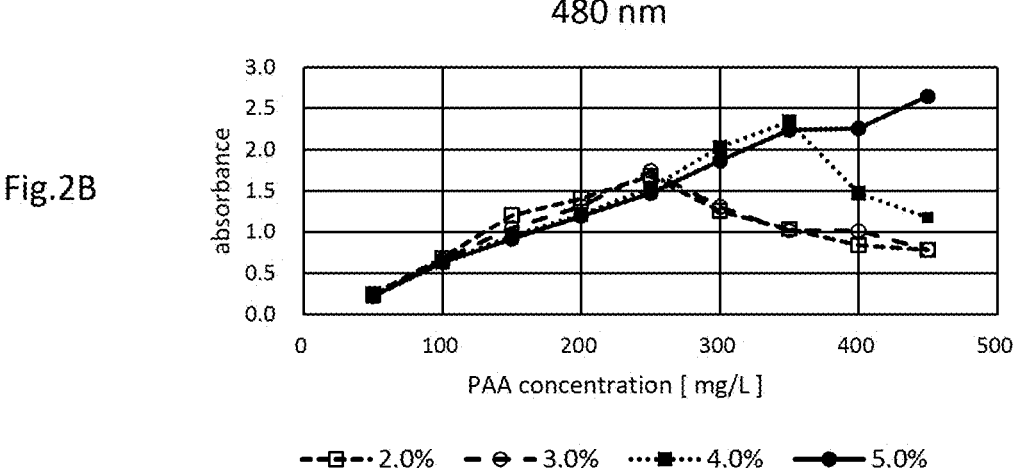
Figure 2C:
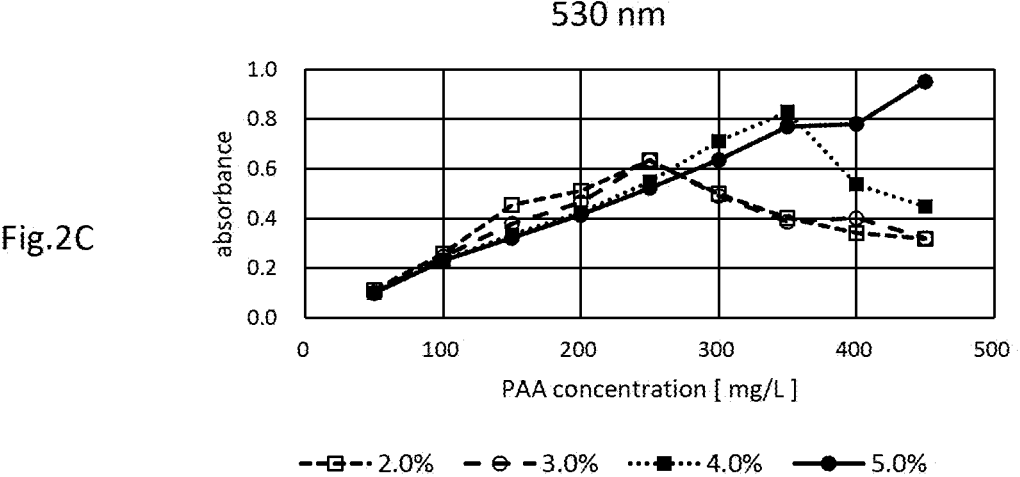
Figure 3A:
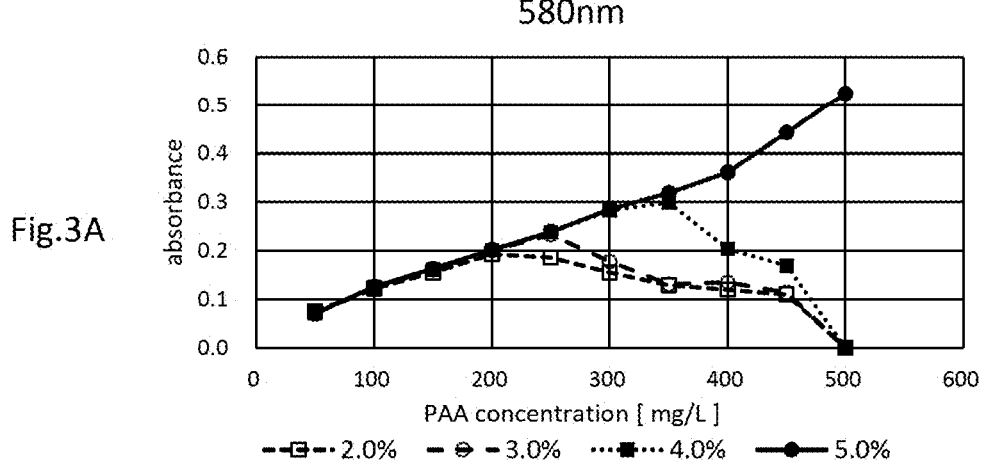
FIGS. 3A and 3B are graphs illustrating the change in absorbance with respect to the concentration of the peracetic acid formulation in a target solution when the concentration of potassium iodide is 2 to 5%.
Figure 3B:
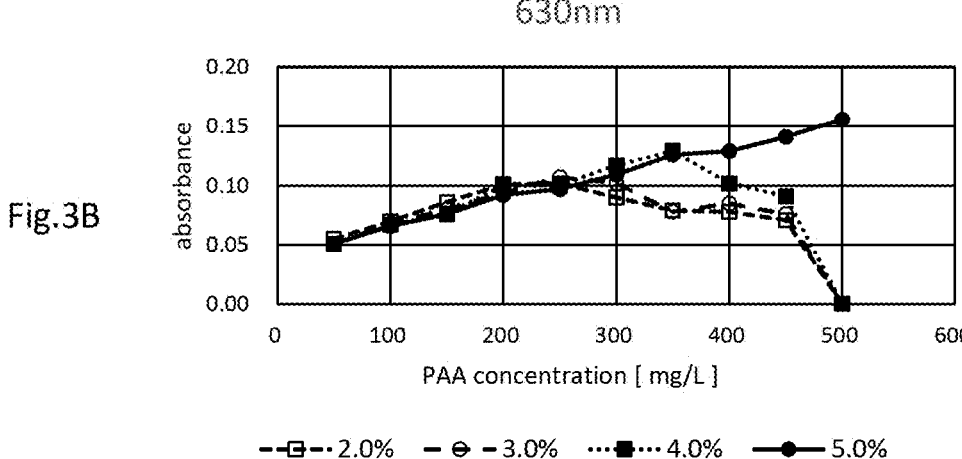
Figure 4A:
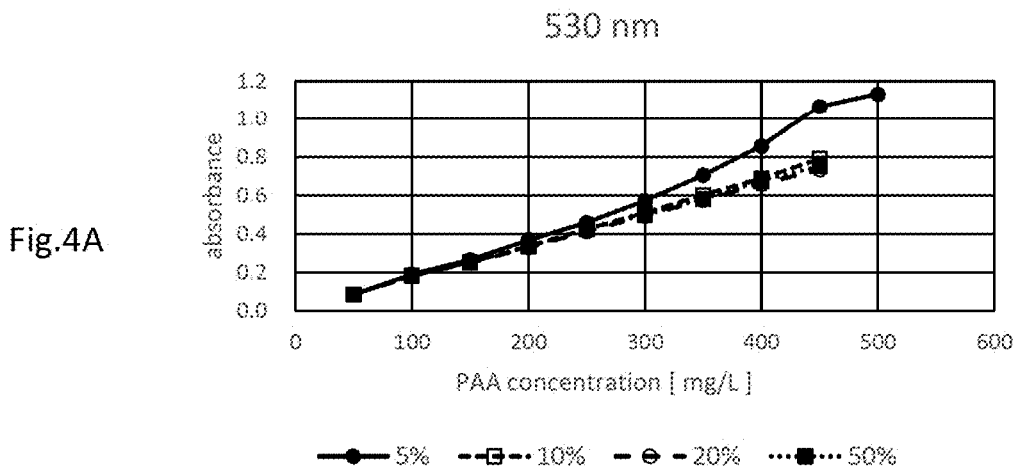
FIGS. 4A to 4C are graphs illustrating the change in absorbance with respect to the concentration of the peracetic acid formulation in the target solution when the concentration of potassium iodide is 5 to 50%.
Figure 4B:
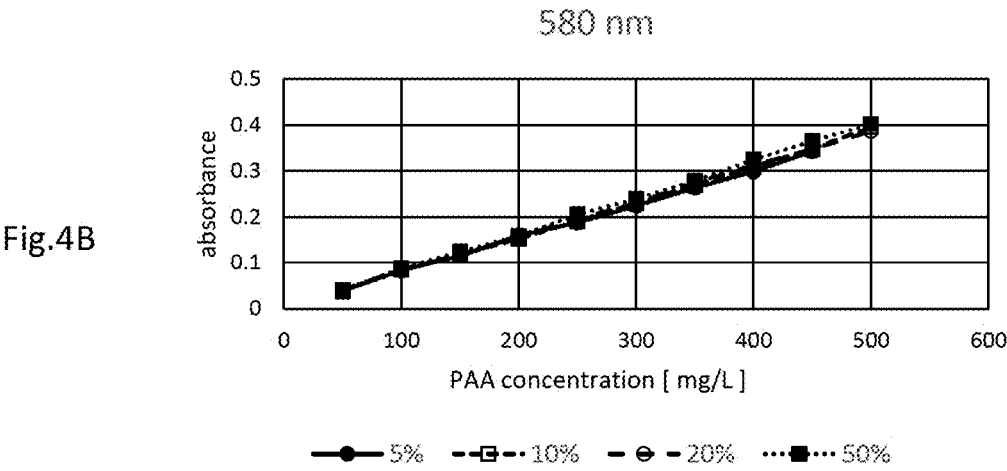
Figure 4C:
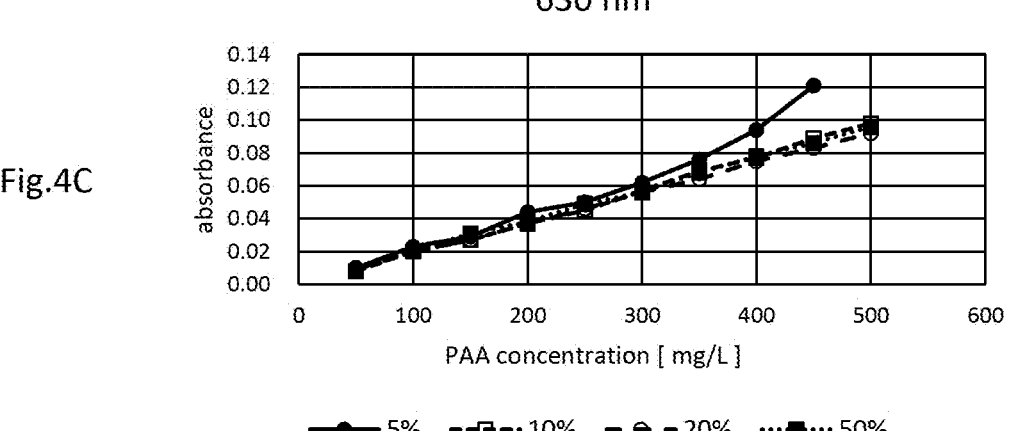
Figure 5A:
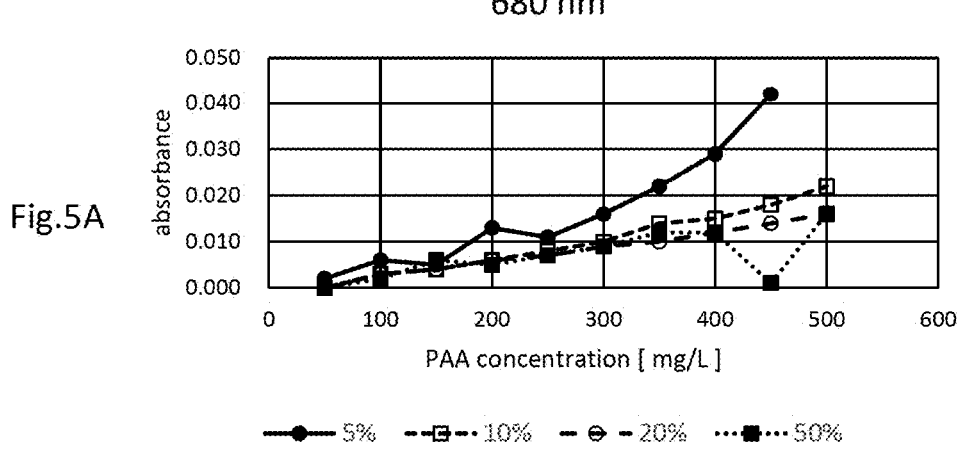
FIGS. 5A and 5B are graphs illustrating the change in absorbance with respect to the concentration of the peracetic acid formulation in the target solution when the concentration of potassium iodide is 5 to 50%.
Figure 5B:
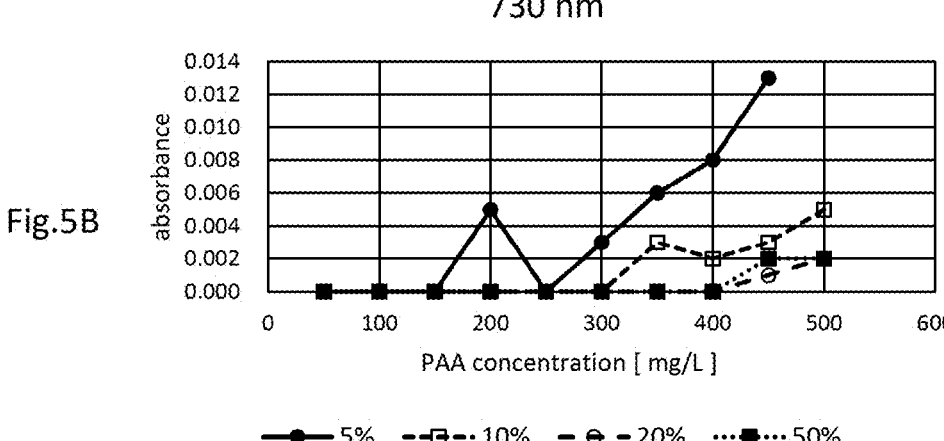

FIG. 2A: measurement light wavelength 430 nm
FIG. 2B: measurement light wavelength 480 nm
FIGS. 2C and 4A: measurement light wavelength 530 nm
FIGS. 3A and 4B: measurement light wavelength 580 nm
FIGS. 3B and 4C: measurement light wavelength 630 nm
FIG. 5A: measurement light wavelength 680 nm
FIG. 5B: measurement light wavelength 730 nm With regard to the transmitted light (wavelengths of 480 nm, 530 nm, 580 nm, and 630 nm) shown in FIGS. 2B, 2C, 3A, 3B, 4A, 4B, and 4C, when the concentration of potassium iodide is 5%, the concentration of the peracetic acid formulation is approximately proportional to the absorbance. On the contrary, in FIGS. 2B, 2C, 3A, and 3B, it can be seen that the peracetic acid formulation concentration is not proportional to the absorbance when the concentration is less than 5%.

For the transmitted light shown in FIG. 5A, the peracetic acid formulation concentration and the absorbance are approximately proportional in the range where the potassium iodide concentration exceeds 5%.

As described above, with regard to the transmitted light shown in FIGS. 2B, 2C, 3A, 3B, 4A, 4B, 4C, and 5A, i.e., the transmitted light in the wavelength range from 480 nm to 680 nm, the peracetic acid formulation concentration determined by the potassium iodide concentration was found to be approximately proportional to the absorbance.

Comparing those figures, it can be seen that the linearity of the change between the peracetic acid formulation concentration and the absorbance increases when the wavelength of the measurement light is in the range from 530 nm to 680 nm, and further, in the range from 530 nm to 630 nm.

FIG. 6 is a spectral diagram illustrating the change in absorbance with respect to the wavelength of the incident light to the target solution when the concentration of the peracetic acid formulation is changed every 50 mg/L or 25 mg/L when the concentration of potassium iodide as the reagent is 10%, and FIG. 7 is an enlarged view of a part of FIG. 6 (absorbance: 2.0 or less, wavelength: 400 to 600 nm). FIGS. 8 and 9 are diagrams showing wavelengths (minimum wavelength, center wavelength, and maximum wavelength) exhibiting absorbances of 0.5, 1.0 and 1.5 with respect to the concentrations of the peracetic acid formulation solution in the target solution, and the coloration of the target solution. FIG. 8 shows the cases where the concentration of the peracetic acid formulation solution is 25 to 300 mg/L, and FIG. 9 shows the cases where the concentration of the peracetic acid formulation solution is 350 to 600 mg/L. The "center wavelength" in FIGS. 8 and 9 is a wavelength at which the line of each concentration shown in FIGS. 6 and

7 reaches a predetermined absorbance, and is included in a wavelength range from the "minimum wavelength" to the "maximum wavelength".

The spectra in FIGS. 6 to 9 were measured by using a ratio-beam spectrophotometer U-5100 (model number) available from Hitachi High-Tech Science Corporation, and the peracetic acid formulation concentration was measured by using a peracetic acid counter PA-300 (model number) manufactured by Hiranuma Sangyo.

As shown in FIGS. 6 and 7, when the concentration of the peracetic acid formulation is changed every 50 mg/L or 25 mg/L, the respective target solutions exhibit mutually different wavelengths at a common absorbance 1.5, and the respective wavelengths increase as the concentration increases. Therefore, it is possible to determine the concentration of the peracetic acid formulation simply, quickly, and accurately by visual identification by using a plurality of color samples each having a color corresponding to each of the target solutions.

The same is true for the absorbances of 1.0 and 0.5, between 1.5 and 1.0, and between 1.0 and 0.5, in that each concentration of the peracetic acid formulation exhibits mutually different wavelengths and the higher the concentration, the larger the wavelength. Therefore, when the absorbance is 1.0 or 0.5 as well, the concentration of the peracetic acid formulation can be determined by visual identification by using a plurality of color samples.

The lines for each concentration shown in FIGS. 6 and 7 are the lines passing through the "central wavelength" of each absorbance in FIGS. 8 and 9. On the other hand, the minimum wavelength and the maximum wavelength in FIGS. 8 and 9 indicate wavelengths in a range that does not overlap the adjacent concentration lines, and the determination of the concentration of the peracetic acid formulation with visual identification is also possible by using a color sample exhibiting a color corresponding to the range from the minimum wavelength to the maximum wavelength.

In the field of light absorption analysis using a photometer, the error curve of Twyman-Lothian or Twyman-Lothian's Law is known to express the relation between translucency/transmittance and measurement error. According to this error curve (law), the practical measurement range of absorbance is 0.05 to 1.5. With regard to the results shown in FIGS. 6 to 9, it was confirmed that in a practical measurement range from at least 0.5 to 1.5, mutually different wavelengths were shown for each concentration of the peracetic acid formulation, and that the higher the concentration, the longer the wavelength. Thus, in a practical measurement range, it has been found by the inventors that each concentration of the peracetic acid formulation has a mutually different wavelength, and the higher the concentration, the longer the wavelength; the inventors confirmed similar results in the study for reagents with concentrations other than 10%.

As can be seen from "coloration of target solution" in FIG. 8, the color changes from 600 mg/L to 25 mg/L in the order of brown, reddish purple, red, orange, and yellow, and in the range from 500 mg/L to 50 mg/L, adjacent target solutions are visually distinguishable from each other. In contrast, visual distinguishability was prominently reduced at concentrations below 50 mg/L and above 500 mg/L. Therefore, for a simple visual determination, a concentration range of 50 mg/L to 500 mg/L is preferable.

Although the present invention has been described with reference to the above-described embodiments, the present invention is not limited to the above-described embodiments, and may be improved or modified for the purpose of improvement or within the scope of the present invention.

INDUSTRIAL APPLICABILITY

As described above, the peracetic acid formulation concentration determination method according to the present invention is useful in that the concentration of the peracetic acid formulation can be determined simply and quickly with high accuracy.

REFERENCE SIGNS LIST 10 peracetic acid formulation concentration determination apparatus
11 housing
12 container
13 light source
14 light source control unit
15 color sample display part
15a, 15b, 15c, 15d, 15e, 15f color samples

The invention claimed is:
1. A method for determining concentration of a peracetic acid,
comprising a step of forming a target solution comprising combining a peracetic acid containing composition with a reagent of a predetermined concentration, and placing the target solution into a light-transmissive container,
wherein the peracetic acid containing composition, comprises peracetic acid at a concentration in a range of 50 mg/L to 500 mg/L,
a step of transmitting light through the light-transmissive container that contains the target solution,
a step of comparing a color of the transmitted light transmitted through the light-transmissive container that contains the target solution against a plurality of color samples so that the concentration of the peracetic acid in the target solution is determined, wherein each color sample of the plurality of color samples represents a color corresponding to a different predetermined concentration of peracetic acid within a range of 50 mg/L to 500 mg/L
wherein the target solution exhibits an absorbance of 1.5 with respect to light at a wavelength range-from 410 nm to 509 nm, and
wherein the reagent of the predetermined concentration is potassium iodide at a concentration of 10%.
2. The method for determining concentration of a peracetic acid according to claim 1,
wherein each of the plurality of color samples a color corresponding to the target solution containing a solution of the peracetic acid at a concentration selected from a range consisting of 50 mg/L to 500 mg/L,
the target solution containing a solution of the peracetic acid composition at a concentration of 50 mg/L exhibits an absorbance of 1.5 with respect to light at a wavelength of 430 nm, and
the target solution containing a solution of the peracetic acid composition at a concentration of 500 mg/L exhibits an absorbance of 1.5 with respect to light at a wavelength of 505 nm.
3. The method for determining concentration of a peracetic acid according to claim 2, wherein the target solution containing a solution of the peracetic acid composition at a concentration of 50 mg/L exhibits an absorbance of 1.5 with respect to light at a wavelength range from 410 nm to 450 nm.
4. The method for determining concentration of a peracetic acid according to claim 2, wherein the target solution containing a solution of the peracetic acid composition at a concentration of 500 mg/L exhibits an absorbance of 1.5 with respect to light at a wavelength range from 501 nm to 509 nm.
5. The method for determining concentration of a peracetic acid according to claim 2, wherein:
each of the plurality of color samples exhibit a color corresponding to the target solution of the peracetic acid at a concentration selected from the group consisting of 100 mg/L, 150 mg/L, 200 mg/L, 250 mg/L, 300 mg/L, 350 mg/L, 400 mg/L, and 450 mg/L,
the target solution containing a solution of the peracetic acid composition at a concentration of 100 mg/L exhibits an absorbance of 1.5 with respect to light at a wavelength of 455 nm,
the target solution containing a solution of the peracetic acid composition at a concentration of 150 mg/L exhibits an absorbance of 1.5 with respect to light at a wavelength of 465 nm,
the target solution containing a solution of the peracetic acid composition at a concentration of 200 mg/L exhibits an absorbance of 1.5 with respect to light at a wavelength of 475 nm,
the target solution containing a solution of the peracetic acid composition at a concentration of 250 mg/L exhibits an absorbance of 1.5 with respect to light in at a wavelength of 480 nm,
the target solution containing a solution of the peracetic acid composition at a concentration of 300 mg/L exhibits an absorbance of 1.5 with respect to light at a wavelength of 485 nm,
the target solution containing a solution of the peracetic acid composition at a concentration of 350 mg/L exhibits an absorbance of 1.5 with respect to light at a wavelength of 490 nm,
the target solution containing a solution of the peracetic acid composition at a concentration of 400 mg/L exhibits an absorbance of 1.5 with respect to light at a wavelength of 496 nm, and
the target solution containing a solution of the peracetic acid composition at a concentration of 450 mg/L exhibits an absorbance of 1.5 with respect to light at a wavelength of 500 nm.
6. The method for determining concentration of a peracetic acid according to claim 3, wherein the target solution containing a solution of the peracetic acid composition at a concentration of 500 mg/L exhibits an absorbance of 1.5 with respect to light at a wavelength range from 501 nm to 509 nm.
7. The method for determining concentration of a peracetic acid according to claim 3, wherein:
each of the plurality of color samples exhibit a color corresponding to the target solution of the peracetic acid at a concentration selected from the group consisting of 100 mg/L, 150 mg/L, 200 mg/L, 250 mg/L, 300 mg/L, 350 mg/L, 400 mg/L, and 450 mg/L,
the target solution containing a solution of the peracetic acid composition at a concentration of 100 mg/L exhibits an absorbance of 1.5 with respect to light at a wavelength of 455 nm, the target solution containing a solution of the peracetic acid composition at a concentration of 150 mg/L exhibits an absorbance of 1.5 with respect to light at a wavelength of 465 nm, the target solution containing a solution of the peracetic acid composition at a concentration of 200 mg/L exhibits an absorbance of 1.5 with respect to light at a wavelength of 475 nm, the target solution containing a solution of the peracetic acid composition at a concentration of 250 mg/L exhibits an absorbance of 1.5 with respect to light at a wavelength of 480 nm, the target solution containing a solution of the peracetic acid composition at a concentration of 300 mg/L exhibits an absorbance of 1.5 with respect to light at a wavelength of 485 nm, the target solution containing a solution of the peracetic acid composition at a concentration of 350 mg/L exhibits an absorbance of 1.5 with respect to light at a wavelength of 490 nm, the target solution containing a solution of the peracetic acid composition at a concentration of 400 mg/L exhibits an absorbance of 1.5 with respect to at a wavelength of 496 nm, and the target solution containing a solution of the peracetic acid composition at a concentration of 450 mg/L exhibits an absorbance of 1.5 with respect to light at a wavelength of 500 nm.

8. The method for determining concentration of a peracetic acid according to claim 4, wherein:

each of the plurality of color samples exhibit a color corresponding to the target solution of the peracetic acid at a concentration selected from the group consisting of 100 mg/L, 150 mg/L, 200 mg/L, 250 mg/L, 300 mg/L, 350 mg/L, 400 mg/L, and 450 mg/L, the target solution containing a solution of the peracetic acid composition at a concentration of 100 mg/L exhibits an absorbance of 1.5 with respect to light at a wavelength of 455 nm, the target solution containing a solution of the peracetic acid composition at a concentration of 150 mg/L exhibits an absorbance of 1.5 with respect to light at a wavelength of 465 nm, the target solution containing a solution of the peracetic acid composition at a concentration of 200 mg/L exhibits an absorbance of 1.5 with respect to light at a wavelength of 475 nm, the target solution containing a solution of the peracetic acid composition at a concentration of 250 mg/L exhibits an absorbance of 1.5 with respect to light at a wavelength of 480 nm, the target solution containing a solution of the peracetic acid composition at a concentration of 300 mg/L exhibits an absorbance of 1.5 with respect to light at a wavelength of 485 nm, the target solution containing a solution of the peracetic acid composition at a concentration of 350 mg/L exhibits an absorbance of 1.5 with respect to light at a wavelength of 490 nm, the target solution containing a solution of the peracetic acid composition at a concentration of 400 mg/L exhibits an absorbance of 1.5 with respect to light at a wavelength of 496 nm, and the target solution containing a solution of the peracetic acid composition at a concentration of 450 mg/L exhibits an absorbance of 1.5 with respect to light at a wavelength of 500 nm.

* * * * *